United States Patent [19]

Lambert et al.

[11] Patent Number: 5,230,321
[45] Date of Patent: Jul. 27, 1993

[54] LEAN-BURN INTERNAL COMBUSTION GAS ENGINE

[75] Inventors: John E. Lambert, Dublin, Ohio; David W. Procknow, Wauwatosa, Wis.; David A. Trayser, Plain City, Ohio

[73] Assignee: Gas Research Institute, Chicago, Ill.

[21] Appl. No.: 917,764

[22] Filed: Jul. 21, 1992

[51] Int. Cl.⁵ ............................................. F02B 23/00
[52] U.S. Cl. .................................. 123/661; 123/667; 123/193.5
[58] Field of Search ................ 123/193.5, 263, 306, 123/661, 667

[56] References Cited

U.S. PATENT DOCUMENTS

| | | | |
|---|---|---|---|
| 2,758,576 | 8/1956 | Schlamann | 123/27 |
| 2,800,123 | 7/1957 | Fisher | 123/191 |
| 4,000,722 | 1/1977 | May | 123/30 |
| 4,094,272 | 6/1978 | May | 123/30 |
| 4,119,065 | 10/1978 | Noguchi et al. | 123/32 SP |
| 4,121,544 | 10/1978 | May | 123/30 |
| 4,267,806 | 5/1981 | Kanda et al. | 123/287 |
| 4,291,655 | 9/1981 | Yamakawa | 123/306 |
| 4,291,662 | 9/1981 | Nakamura et al. | 123/661 |
| 4,329,955 | 5/1982 | Muranaka et al. | 123/260 |
| 4,331,115 | 5/1982 | May | 123/263 |
| 4,366,789 | 1/1983 | Eckert | 123/263 |
| 4,541,376 | 9/1985 | Thomas | 123/280 |
| 4,751,902 | 6/1988 | August | 123/263 |
| 4,893,596 | 1/1990 | Nonaka | 123/193 |

OTHER PUBLICATIONS

SAE Technical Paper No. 820166 "Gasoline Engine Combustion-The High Ratio Compact Chamber", R. H. Thring & M. T. Overington, Copyright 1982 Society of Automotive Engineers.

"Design and Test of an Internal Combustion Gas Engine for Residential Heat Pumps", by J. C. Swain et al., 1986 International Gas Research Conference.

"Gasoline Engines and Their Future", by R. H. Thring, PP40-51, Mechanical Engineering Oct., 1983.

*Primary Examiner*—Noah P. Kamen
*Attorney, Agent, or Firm*—Brooks & Kushman

[57] ABSTRACT

A small bore internal combustion engine our-stroke operating cycle which is adapted to function with natural gas and other gaseous fuels and which is particularly useful with residential heat pump assemblies with maximum life expectancy, high thermal efficiency, and low exhaust gas emissions, wherein provision is made for assembling the engine in a compact heat pump system with a low operating noise level and an extended engine maintenance interval.

10 Claims, 8 Drawing Sheets

LEAN-BURN INTERNAL COMBUSTION GAS ENGINE

TECHNICAL FIELD

This invention relates to gas-fueled internal combustion engines adapted especially for residential heat pump systems.

DISCUSSION OF THE BACKGROUND ART

It is well known in the prior art to use high compression ratio combustion chambers for internal combustion engines using a gasoline vapor fuel for stationary installations. These include four-stroke cycle internal combustion engines in which the fuel is injected directly into the air intake port of the combustion chamber or into the air induction manifold as well as engines that use a carburetted air/fuel supply. Research and development efforts in recent years have built upon earlier technology devoted to Otto cycle gasoline engines to improve the specific power output and to satisfy the recent emphasis placed on improving exhaust emissions and increasing fuel economy.

It is recognized that one of the ways to achieve improved fuel economy and to reduce undesirable exhaust emissions is to design the combustion chamber to achieve higher compression ratios while avoiding undesirable fuel pre-ignition in the cylinders. An attempt has been made in recent years also to improve engine operating efficiency by designing the engine to operate at leaner air/fuel ratios.

A high degree of fuel and air mixing is desirable because of its effect on engine performance. This characteristic usually is referred to as a homogeneous mixing of the combustible charge. It takes into account the gas dynamics, heat transfer and mass transfer that occurs during the induction process and during the combustion stages of the operating cycle.

The homogeneous nature of the combustible charge is affected by the timing of the opening of the inlet and exhaust valves during the combustion cycle, the presence of exhaust gas residuals and the mixing of the air and fuel in the combustion chamber, as well as the leanness of the air and fuel mixture.

Factors that affect the characteristics of the combustible mixture in the combustion chamber include the heat transfer that occurs between the cylinder walls and the combustible charge at the time of induction as well as at later stages in the combustion stroke. The combustion cycle is not truly adiabatic.

The parameters that affect the combustion and the combustion efficiency are the degree of advance of the spark timing and the characteristics of the flame front as well as the presence of pre-ignition reactions and so-called "hot spots" in the combustion chamber.

It also is known in the art that the generation of a pre-combustion by the spark of the ignition spark plug will generate a heat release that is greater than the heat loss to the surrounding gases at the initiation of combustion. The compression ratio and air/fuel ratio can be tailored to enable the so-called "hot nucleus" to both initiate and maintain combustion.

The delay between the timing of the spark and commencement of flame front propagation is affected by turbulence within the combustion chamber. Excessive turbulence, however, affects the initiation of the flame front because excessive turbulence can cause the flame front to be extinguished.

The effect of abnormal combustion also has long been recognized. It is generally acknowledged that this is due to the spontaneous ignition at several places within the unburned charge. That characteristic also is affected by the quality of the turbulence within the combustion chamber.

Compact combustion chambers have been used in some prior art designs. These include engines having compact combustion chambers located in the head of the cylinder or in the piston itself, and provision is made for obtaining a swirl of the intake gases at the time of entry of the charge into the reduced compact chamber volume.

Such homogeneous charge engines are distinguishable from so-called stratified charge engines, which are characterized by a rich mixture at the location on the spark plug and a leaner mixture elsewhere within the combustion chamber. This permits the engine to be operated at wide open throttle settings or at throttle settings near the wide open position, thus giving good fuel economy. This results, however, in low emission quality because the flame front may be extinguished, especially at light loads, before traversing the combustion chamber.

An example of a prior art four-cycle internal combustion engine in which provision is made for obtaining turbulence or a vortex in the combustion chamber is described in U.S. Pat. No. 4,000,722. That patent comprises an engine having a cylinder head that is equipped with a single inlet valve and a single outlet valve. Turbulence for the vortex normally is developed in a so-called swirl chamber within the cylinder. Typically, the height of the swirl chamber is less than its width, but the width is less than the total diameter of the combustion chamber so that the intake charge is characterized by a portion that has high turbulence and a separate portion that has a high surface-to-volume ratio.

A channel-type recess is formed in the cylinder head of the design of the '722 patent to facilitate the influx of fuel and air into a so-called swirl chamber, thus developing a rotational flow of the combustible gases. To facilitate the rotational flow or swirl, a guide channel extends in the direction of the rotation of the gas mixture within the cylinder. The height of the channel increases in the direction of the gas flow.

U.S. Pat. No. 4,329,955 shows a combustion chamber for an internal combustion engine wherein the exhaust valve is located at the center of two contiguous spherical chambers, each chamber having a swirl path which is adapted to sweep unburned gases from the combustion chamber during the combustion of the fuel, thereby improving engine performance. A separate spark plug is used to ignite gaseous fuel in each of the contiguous chambers.

U.S. Pat. No. 4,541,376 shows a four-stroke cycle engine having a deflector located in the intake gas flow path in the region of the swirl chamber so that swirl motion is broken into small-scale eddies by a spoiler device located in the combustion chamber. The introduction of turbulence is timed with the operation of the intake valve so that maximum turbulence will occur at the end of the compression stroke. The spark plug that initiates combustion is arranged in the cylinder head in a so-called quiescent zone near the spoiler device.

In the engine disclosed in U.S. Pat. No. 2,800,123, the intake valve and the exhaust valve are located in a common swirl chamber which is surrounded by a so-called squish zone. The majority of the gaseous charge, which is disposed around the spark plug located within the swirl chamber, will be burned rapidly. When the piston approaches the cylinder head, the large surface area of the squish zone will prevent premature burning of the charge, although the gases in that zone are compressed more rapidly than the gases in the remaining portions of the combustion chamber. Thus, the high velocity gases prior to ignition will flow into the high turbulence portion of the combustion chamber.

The spark plug is strategically located in the combustion zone, and the flame front, following ignition, will travel from the electrodes of the spark plug toward the more remote regions of the combustion chamber. Pre-ignition of the unburned gases in the region of the squish chamber as the flame front advances is discouraged because of the high heat transfer from the gases to the surrounding walls of the squish chamber. Although this may tend to reduce pre-ignition, it contributes to a high heat transfer between the gases and the surrounding wall and lowers thermal efficiency.

It also is known in the art to condition internal combustion engines of this type for operation with extra lean mixtures by providing a so-called torch device in the form of a pre-ignition auxiliary chamber that receives the air/fuel mixture at the time of the compression of the mixture and the mixture is ignited. That ignition tends to maintain combustion in the main portion of the combustion chamber, notwithstanding the presence of a lean air/fuel mixture. An attempt is made to increase the flame front propagation speed in the main combustion chamber by the torching effect of the flame turbulence in the auxiliary chamber, thereby improving the combustibility of the lean air/fuel mixture.

An example of such a pre-ignition chamber arrangement is described in U.S. Pat. No. 4,291,662, wherein a squish area establishes turbulence in a compact combustion chamber region and in a pre-combustion chamber. A spark plug is located at a point of communication between the two combustion chambers. A stable combustion condition is maintained using a lean air/fuel mixture in the auxiliary combustion chamber which establishes a burning jet or torch which is injected through the point at which the two combustion chambers are connected. The swirling motion of the air/fuel mixture in the combustion chamber is established by a so-called squish flow developed as the piston approaches top dead center and reduces the volume of the portion of the combustion chamber not occupied by the main compression chamber.

U.S. Pat. No. 4,331,115 has many of the characteristics described previously, including a swirl chamber, but the intake valve is located at the upper end of the swirl chamber so that entry of the combustible charge into the swirl chamber occurs as the intake passage establishes a tangential or swirling motion of the intake charge. The swirling motion is established by a channel-like connection between the area of the combustion chamber adjacent the exhaust valve and the main combustion chamber, thus establishing a tangential inflow of the charge that is compressed out of the squish area.

This vortex flow can be reinforced during the suction stroke as well as during the compression stroke.

BRIEF DESCRIPTION OF THE INVENTION

The prior art designs that are represented by the references described above are intended to improve the engine performance for gasoline air/fuel mixtures. It is an object of the present invention to develop a lean-burn, spark-ignition gas engine that makes use of gaseous fuels such as natural gas. Heretofore, attempts to use natural gas as a fuel for the engine have involved adapting existing air/gasoline engines for natural gas operation. It is an object of the present invention, however, to develop a small bore engine specifically adaptable for use with gaseous fuels such as natural gas that takes into account the different chemical and physical properties of gaseous fuels as compared with gasoline.

It also is an object of our invention to optimize the combustion system for gaseous fuel operation and to develop an engine having an extra-long life of up to at least 40,000 hours between major overhauls. Such an engine is adaptable especially for use with residential heat pumps.

A heat pump application for the engine requires the engine to be used with a heat pump compressor that operates over a 3:1 speed range while maintaining strict limits on exhaust emissions; specifically, exhaust emissions containing NOx, carbon monoxide and hydrocarbons.

It generally is accepted that low carbon monoxide levels and low NOx levels can be achieved in the absence of a catalytic converter only if the engine is operating with extremely lean air/fuel ratios. It is an object of our invention, therefore, to provide a lean-burn engine characterized by low emissions levels while maintaining high target engine efficiency and high durability. Our improved engine takes advantage of using an oversized engine cylinder with low cylinder pressures and low piston speeds. This integration of heavy duty engine features into a lean-burn, highly efficient engine does not result in a proportional cost increase because such costs are not directly proportional to cylinder size. Lean-burn operation can be achieved without the necessity for using pre-combustion chamber designs, such as those liquid fuel designs disclosed in the prior art discussed above, and without degrading engine efficiency.

It is known that flame propagation speed for a lean mixture is slower than for a rich mixture. Further, it is known that natural gas used as a fuel results in a slower burn than the rate of burn of a gasoline/air charge. An attempt to increase thermal efficiency of an internal combustion engine that uses a gas fuel and lean mixtures requires the use of higher compression ratios. The knock tendencies, however, establish a limit on the reliance of higher compression ratio operation to achieve the target thermal efficiencies, especially in view of the increasing slowness of combustion that is characteristic of lean mixture operation.

High compression ratios tend to promote combustion of lean mixtures. In order to take advantage of this characteristic, the improved combustion chamber of our invention overcomes the limitation normally associated with the slower rate of combustion of lean mixtures of the gaseous fuel. Provision is made in our invention for increasing the rate of combustion so that there is less time for knock or abnormal combustion to occur with the higher compression ratio.

The improved combustion chamber design of the present invention achieves an increase in the rate of flame development at the instant of ignition and an increased rate of flame propagation following ignition with controlled combustion throughout the entire extent of the combustion chamber. This is done by achieving a controlled gas charge motion and turbulence within the combustion chamber and by generating initial combustion in a compact, high ratio zone which is followed by controlled combustion in an extended combustion zone defined in part by a so-called squish region situated in a part of the combustion chamber that is separate from the compact, high ratio zone.

The motion of the combustible charge is developed by generating a controlled turbulence during a so-called squish action as the piston approaches its top dead center position during the compression stroke. This squish action and the strategic geometry of the combustion chamber promote rapid burning of the combustible charge as it develops an efficient turbulence pattern in the combustible charge. This is achieved without reducing the volumetric efficiency of the engine due to the presence of restrictions in the air intake flow path. The turbulence occurs also with a reduced amount of thermodynamic loss due to heat transfer, compared to a high swirl chamber design, during the combustion process and during the reverse motion of the piston during the power stroke. Turbulence that is generated occurs at the proper instant so that irreversible heat loss to the surrounding walls of the combustion chamber is reduced as much as possible.

The gaseous charge is inducted into the combustion chamber, and the combustion products are expelled from the combustion chamber through parallel ports in the cylinder head. The gaseous charge is introduced through the intake port without swirl. The combustible charge enters the high ratio combustion portion of the combustion chamber in a random fashion and with a high degree of minute or microscopic turbulence eddys, thus promoting high flame front propagation and rapid burn. The turbulence is achieved by the high squish ratio; that is, the ratio of the area of the region of the combustion chamber that is separated from and distinct from the high ratio combustion chamber portion to the total area of the combustion chamber.

It is not necessary with our improved design to use torch-type ignition such as that described in references discussed above. The random microscopic turbulence of the gaseous mixture as the mixture enters the high ratio combustion chamber portion of the combustion chamber is sufficient in itself to promote rapid flame propagation.

Rapid burn results in controlled burning with an absence of engine knock. Turbulence which is due to the high squish ratio begins in the squish area and progresses to a kidney-shaped area in which the high ratio combustion occurs. The squish area is large relative to the area of the high ratio combustion chamber portion.

The straight valve arrangement in our improved design makes it possible for the entry of a combustible charge to be relatively quiescent at the completion of the intake stroke. Unlike the designs of the prior art references described above, there is no tangential gas charge entry, and no special gas spoilers are required. The controlled turbulence begins as the mixture is transferred during the compression stroke from the squish area to the high ratio combustion chamber portion. The valve lift may be designed in our improved combustion chamber to be the same as in comparable prior art engines.

The positioning of the spark plug in the high ratio combustion chamber portion of the combustion chamber becomes less critical in our improved design because of the turbulence pattern. Further, the plug height or the position of the electrodes within the combustion chamber is also less critical. The electrodes may be located, therefore, in a relatively remote region of the high ratio combustion chamber where electrode erosion is minimized. Our improved design also makes it possible to use air/fuel ratios that are less critical to efficient combustion, and the same is true for the timing requirements for the spark.

PARTICULAR DESCRIPTION OF THE INVENTION

For purposes of describing the significance of the physical characteristics of the combustion chamber design of our invention, reference first will be made to the charts of FIGS. 6, 7 and 8.

Figure 7:
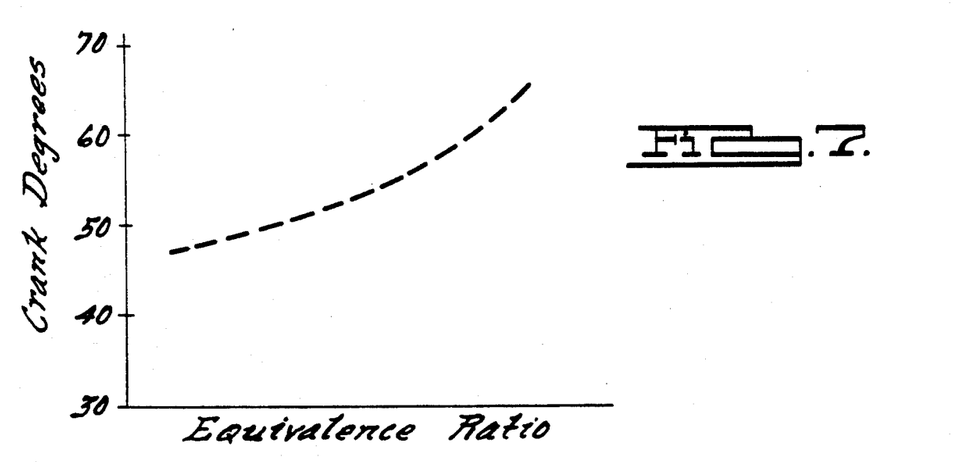
FIG. 7 is a chart showing the relationship between equivalence ratio and the ignition timing measured in crank angle degrees.

FIG. 7 shows the relationship between equivalence ratio and crank angle degrees for a natural gas fuel. In contrast, the same relationship for a gasoline/air mixture would indicate a spark advance of about half as much for any given equivalence ratio. The equivalence ratio, for purposes of the description of FIG. 7, is the actual air/fuel ratio divided by the stoichiometric air/fuel ratio. It is seen that as the equivalence ratio increases, the advance of the spark decreases throughout the entire range of equivalence ratios. Natural gas engines are required to have a substantially advanced ignition timing compared to a gasoline fueled engine.

Figure 6:
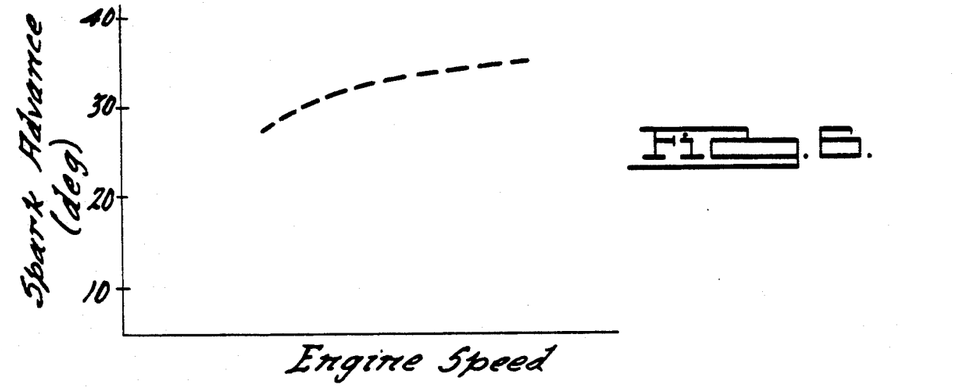
FIG. 6 is a graph showing the relationship between engine speed and spark advance for our improved engine.

Assuming the equivalence ratio is constant, the spark advance with increasing engine speed, as illustrated in FIG. 6, increases for natural gas engines. The amount of the spark advance required for a natural gas engine is substantially grater, however, than the corresponding advance required for gasoline engines at all engine speeds.

Figure 8:
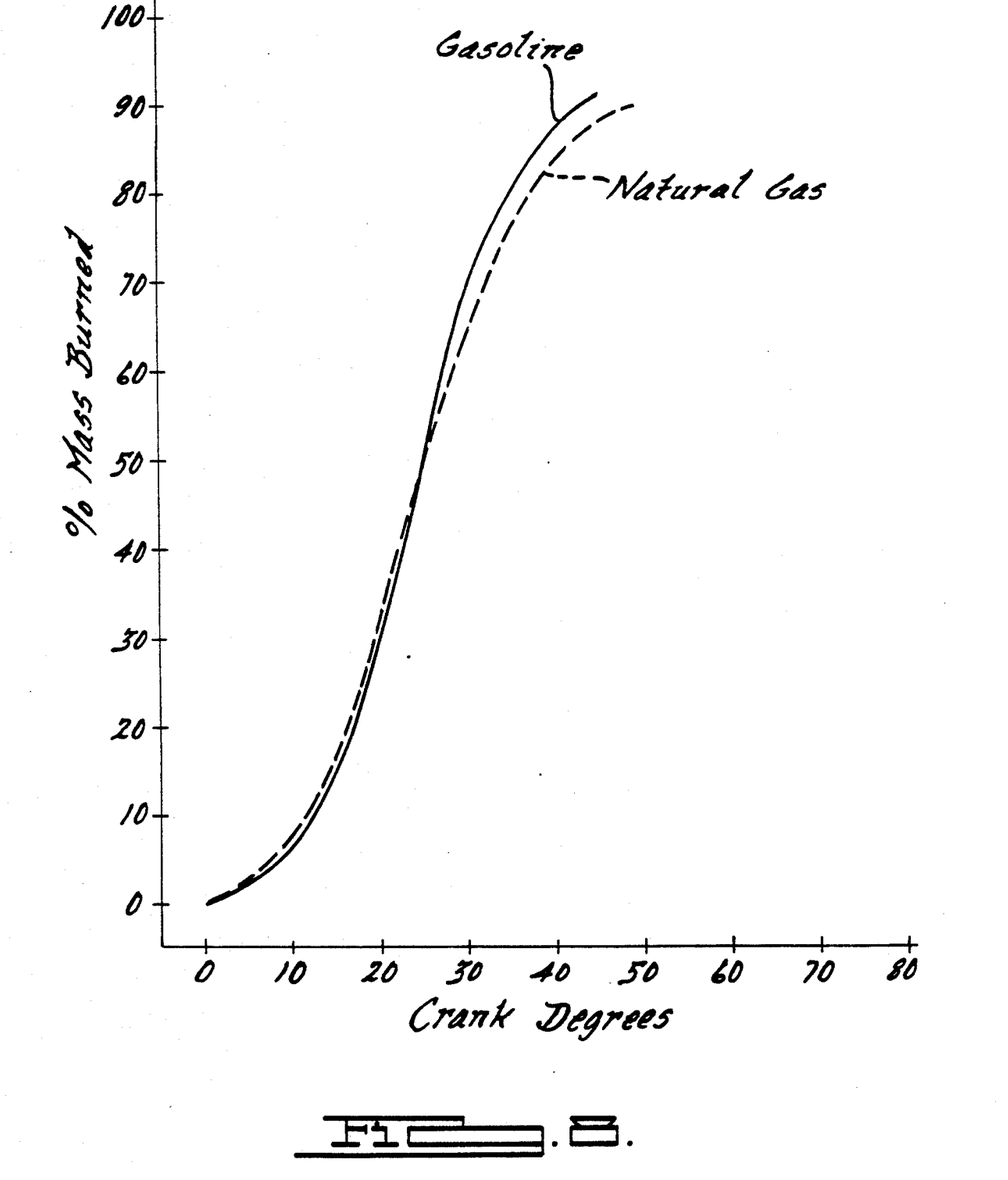
FIG. 8 shows a comparison in the burn rate for a natural gas fuel and for a mixture of gasoline and air for engines having the same basic engine data.

FIG. 8 shows the substantial delay that is required to effect the burn of 10 percent to 90 percent of the mass of the fuel in the combustion chamber. As seen from the chart of FIG. 8, the burn time is significantly longer for natural gas than for gasoline. The full-load stoichiometric test condition illustrated in the data for the chart of FIG. 8 was obtained with an engine speed of 3,000 rpm. It is seen from FIG. 8 that a natural gas engine requires more burn time for a given mass of fuel charge.

The improvements of our invention make it possible for the speed of the combustion to be increased to compensate for the natural tendency for slower burn and the effect of the higher compression ratio that is used for purposes of improving combustion efficiency. The improvements are capable of establishing controlled motion of the charge as it enters the combustion chamber and as it is transferred from the inlet valve region to the combustion zone of the combustion chamber.

It is recognized that the character of the motion of the gas in the combustion chamber must achieve a controlled energy level. A controlled amount of turbulence is desirable to promote good mixing and to prevent the rate of combustion from being too low, but an excessive amount of turbulence energy causes deterioration in the engine operating characteristics. That deterioration might be due to over-rapid burning and excessive heat transfer to the walls of the cylinder during combustion. Excess turbulence also will result in scouring of the boundary layer that normally exists at the walls of the combustion chamber, thus increasing the irreversible heat transfer to the engine coolant and a corresponding reduction of thermal efficiency of the engine.

Figure 1A:
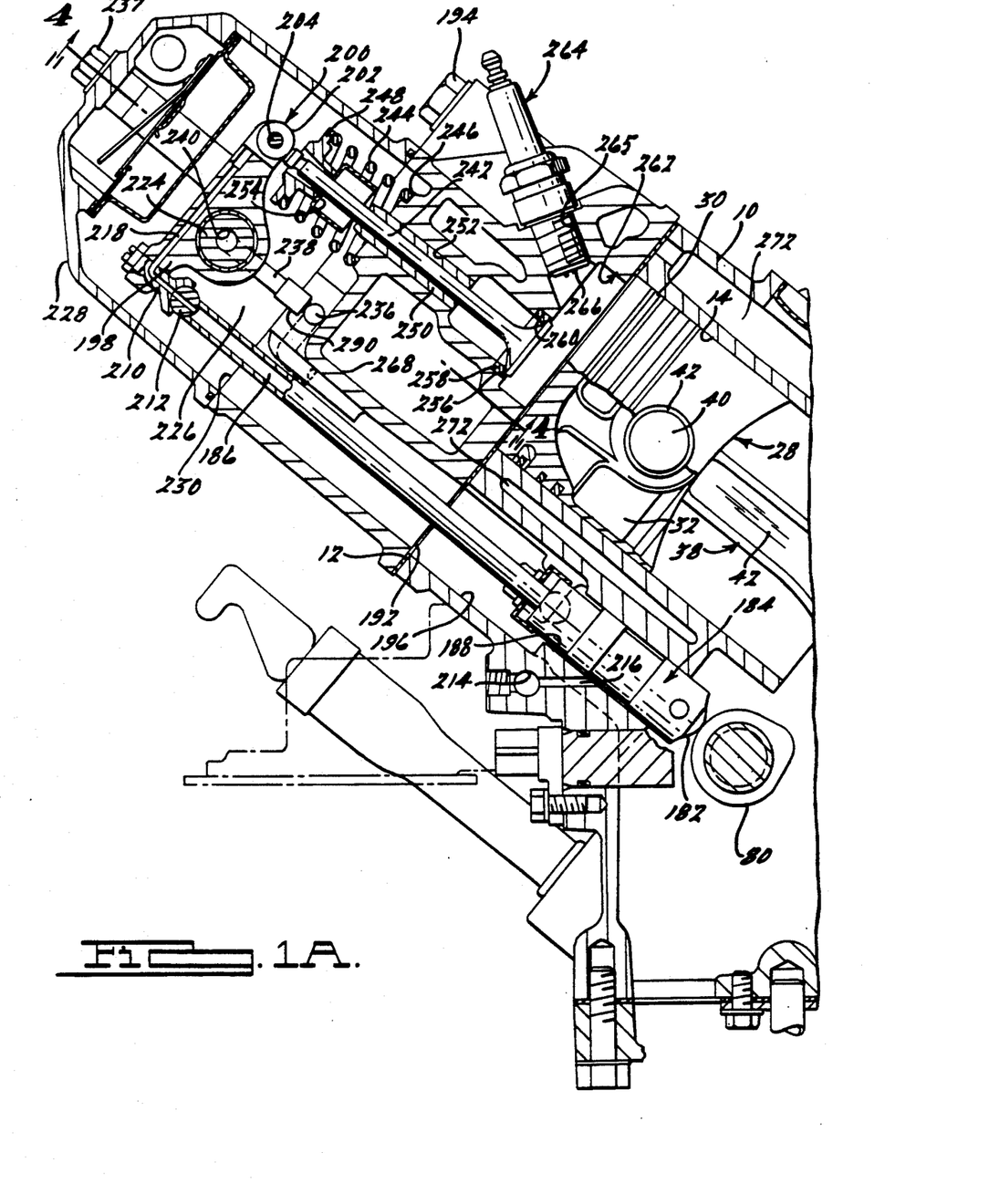
FIG. 1A is a partial cross-sectional view of our improved engine as seen from the plane of a section line that contains the geometric axis of the cylinder.

In FIG. 1A, the engine crankcase is shown at 10. It comprises an upper surface 12 and a cylinder 14. The cylinder block is formed of cast iron, as is the oil sump 16 which provides a base for the engine.

Figure 2A:
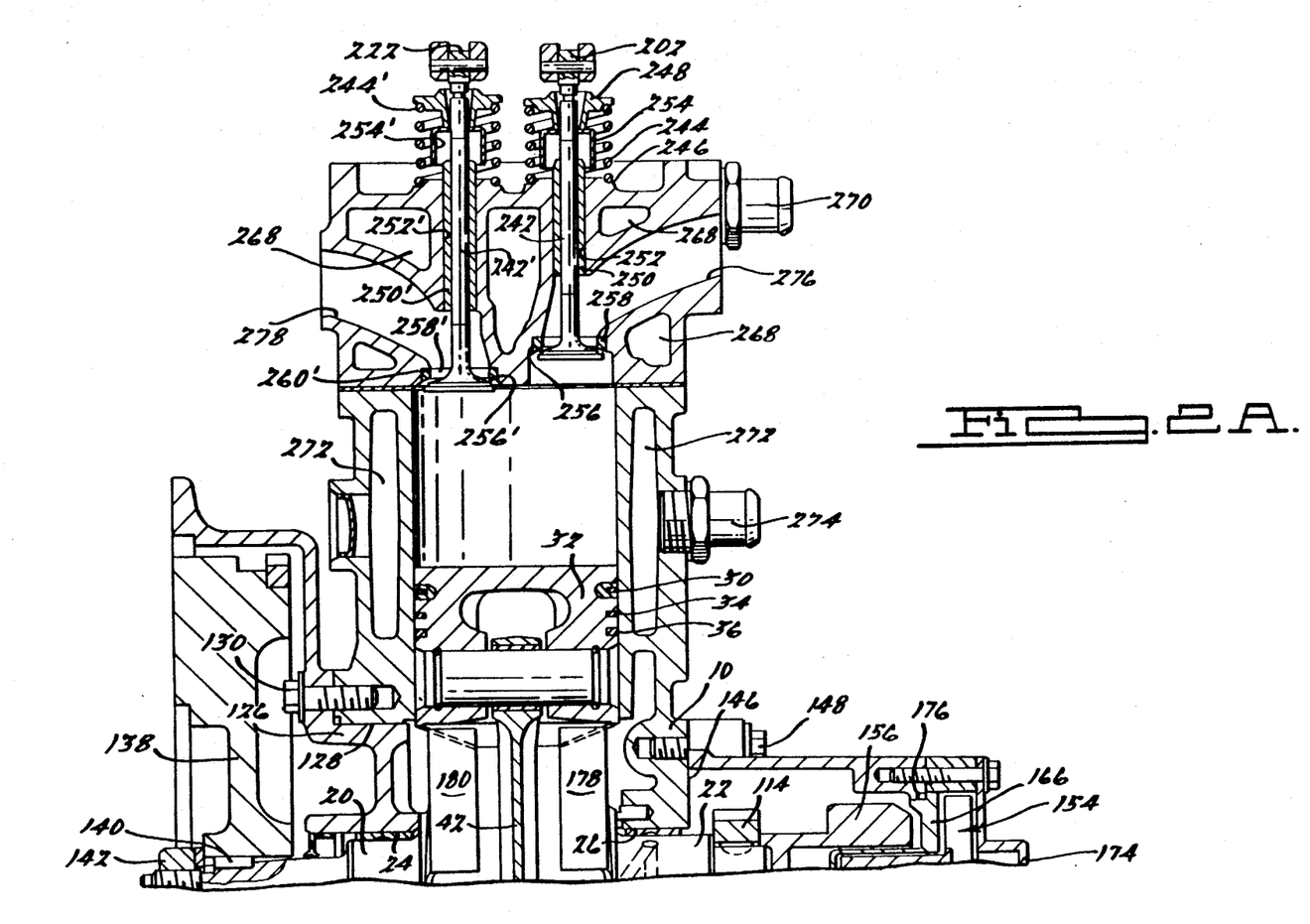
FIG. 2A is a cross-sectional view of the engine as seen from a plane perpendicular to the planes of the sections of FIGS. 1A and 1B.
Figure 2B:
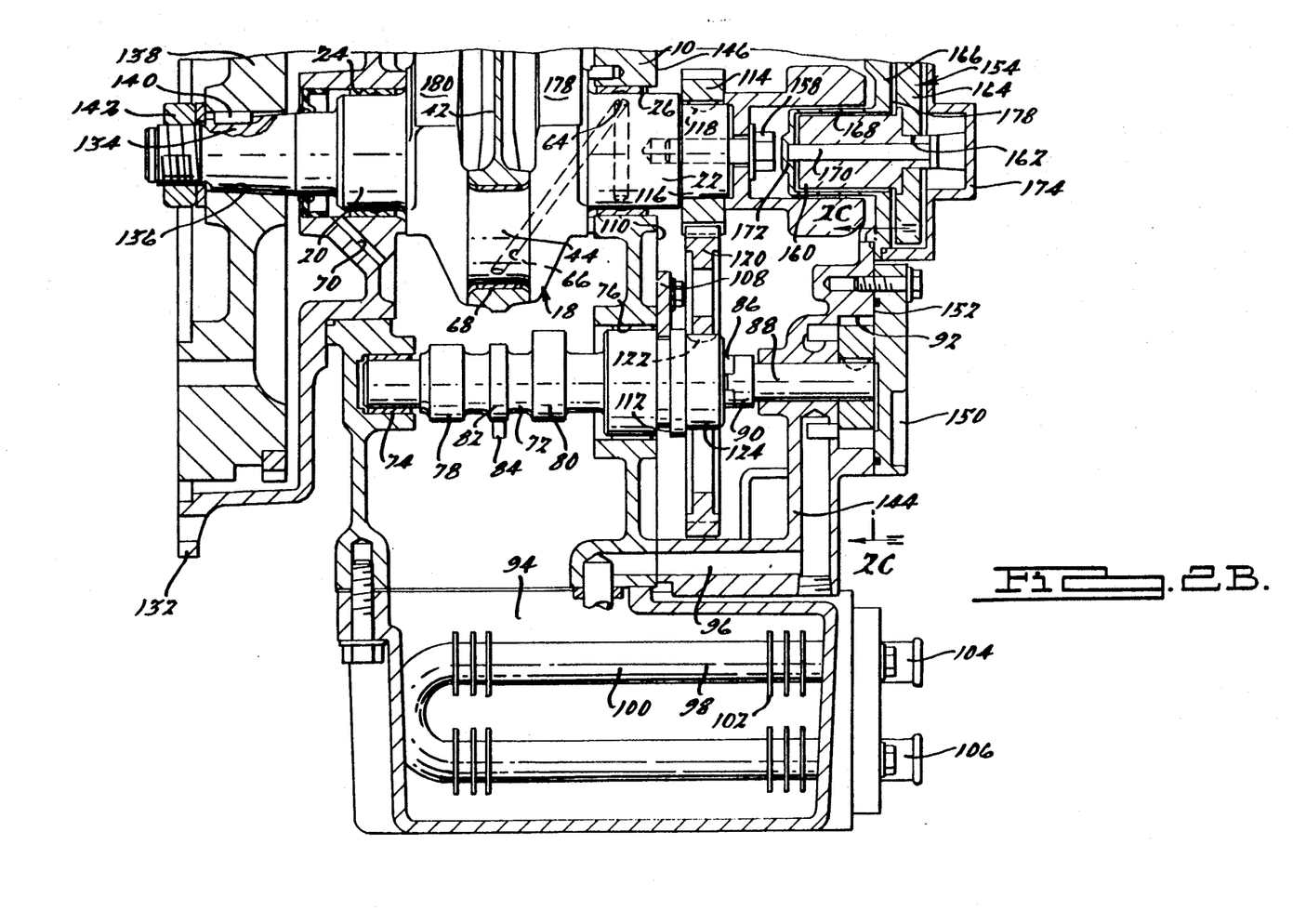
FIG. 2B is a view similar to FIG. 1B, which shows the crankcase as seen from a plane perpendicular to the plane of the sectional view of FIG. 1A.

The cylinder block 10 is a gray cast-iron block, as seen in FIG. 2B. It permits a close bearing separation for the crankshaft main bearings, thus permitting the use of a short, rigid crankshaft which is generally designated in FIG. 2B by reference character 18. The crankshaft main bearings shown at 20 and 22 in FIG. 2B are situated, respectively, in bearing openings 24 and 26 in the walls of the cast housing 10.

A piston 28 is disposed in the cylinder 14. It is formed of a cast aluminum alloy with a ductile iron, chrome-plated top ring assembly 30.

Compression ring 34 is formed of heat treated gray iron with a tapered face having a thickness of two millimeters. The oil ring 36 is a chrome-plated gray iron ring.

Piston 28 is connected to connecting rod 38 by wrist pin 40, which is a full-floating pin with a bronze alloy bushing 42.

The rod 38 is formed with regions of reduced thickness, as seen at 42. The lower end of the rod 38 is secured to crank portion 44 by bearing cap 46.

Figure 2C:
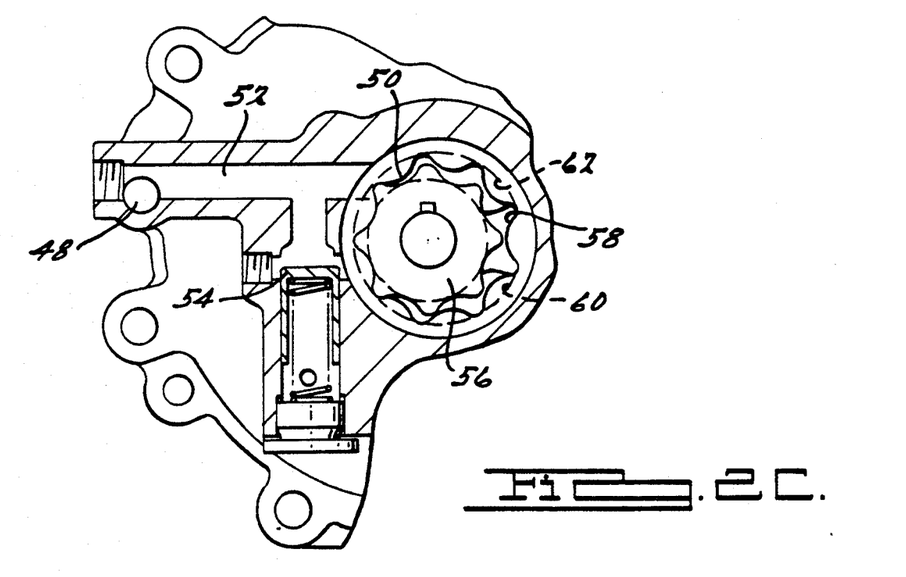
FIG. 2C is a cross-sectional view of the lubrication oil pump as seen from the plane of section line 2C—2C of FIG. 2B.

An oil galley 48 is formed in the cast housing 10, as best seen in FIG. 2C. The outlet of the lubrication oil pump 50, as shown at 52, communicates with the galley 48. A pressure relief valve 54 communicates with the outlet passage 52. If over-pressure occurs, lubricating oil will be bypassed from the outlet path 52 into the sump region of the crankcase 16.

By preference, the pump 50 is of the Gerotor type having an internal pump gear element with external Gerotor teeth, as shown at 56. Those teeth mesh with internal Gerotor teeth recesses 58 in known manner. The Gerotor teeth define pumping cavities which transfer fluid from an inlet port 60 to an outlet port 62, the latter communicating with the outlet passage 52.

Oil is distributed through the internal oil galley to lubrication oil ports for the crankshaft main bearings 20 and 22, the port for bearing 22 being shown at 64. The crankshaft crank portion 44 is provided with an internal lube passage 66, which lubricates crankshaft bearing 68. Lubrication oil for the main bearing 20, after passing through the crankshaft bushing associated with the bearing 20, is drained back to the engine sump through lubrication drain passage 70.

Camshaft 72 is end supported by the case 10 in bearing openings 74 and 76. Inlet and exhaust cams 78 and 80 are formed on the camshaft 72. Intermediate the cams 78 and 80 is a portion 82 which carries a speed sensing timing element 84, which is used for ignition timing purposes.

The end of the camshaft 72, as shown at 86, is coupled to drive shaft 88 for internal pump gear 56 of the pump 50. Shaft 88 is coupled to the end 86 by a coupling element 90.

Pump gears 56 and 58 are enclosed in pump housing 92 which forms a part of the casting 10. The inlet port 60 communicates with oil sump shown at 94 through pump feed passage 96 formed in part in the casting 10. An oil cooler 98, if an oil cooler is needed, may be disposed in the sump 94. It comprises a U-flow cooling passage 100 on which cooling fins 102 are carried. Coolant enters the oil cooler through a suitable fitting 104 and passes to an oil outlet fitting 106.

The camshaft 72 is held in a fixed axial location by a thrust plate 108 bolted to the side face 110 of the case 10. Thrust plate 108 enters a machined groove 112 in the camshaft.

The camshaft is driven by precision helical gears including a drive gear 114 mounted on a gear support portion 116 on one end of the crankshaft. It may be keyed to the support portion 116 by key 118.

Gear 114 engages driven gear 120, which is keyed as shown at 122 to gear support portion 124 at one end of the camshaft 72. The opening 24 for the crankshaft bearing portion 20 is formed in a separate crankshaft housing portion 126, which is received in opening 128 formed in the case 10. It is secured by bolts 130. A flywheel housing is formed by the housing portion 126. The outer periphery of the flywheel housing, as shown at 132, may be bolted or otherwise secured to the housing for a compressor for a residential heat pump assembly. The end of the crankshaft, as shown at 134, is tapered and received in a tapered opening 136 in a flywheel 138. A drive key is shown at 140, and a clamping nut 142 is threaded on the tapered end of the crankshaft to lock the flywheel in place.

The housing enclosure for the pump gears 56 and 58 is a cast aluminum cover 144, which encloses the camshaft drive gears 114 and 120. It is bolted to a machined face 146 on the iron casting 10, suitable bolts 148 being provided for this purpose. A steel cover plate 150 is bolted to the end face 152 of the aluminum casting 144 to provide a closure for the lubrication oil pump gears.

Aluminum casting 144 also encloses a coolant pump generally indicated by reference numeral 154. It comprises a ceramic magnet sleeve 156, which is secured by a bolt 158 to the end portion 116 of the crankshaft. The sleeve 156 surrounds a ferrous ceramic magnet rotor 160. One end of the rotor 160 is formed with a reduced diameter received in an opening 162 formed in an impeller portion 164 having radially extending impeller blades.

A plastic enclosure 166 is secured to the end face 152 of an aluminum housing 144. It includes a cylindrical extension 168 which encloses the rotor 160. The rotor shaft 170 is supported at one end 172 of the extension 168 and is supported at the other end by a coolant pump closure plate 174 secured to the end surface 176 of the enclosure 166. The enclosure 166 and the cylindrical portion 168 provide separation between the coolant chamber 178 and the interior of the crankcase. The rotor 1 60 is a ferrous ceramic magnet having multiple poles which are magnetically coupled with multiple poles of the surrounding magnet portion 156. These poles, which are separated by the plastic of the cylindrical portion 168, establish a magnetic coupling between the crankshaft and the rotor 164. No running seal for the coolant rotor is required.

Figure 1B:
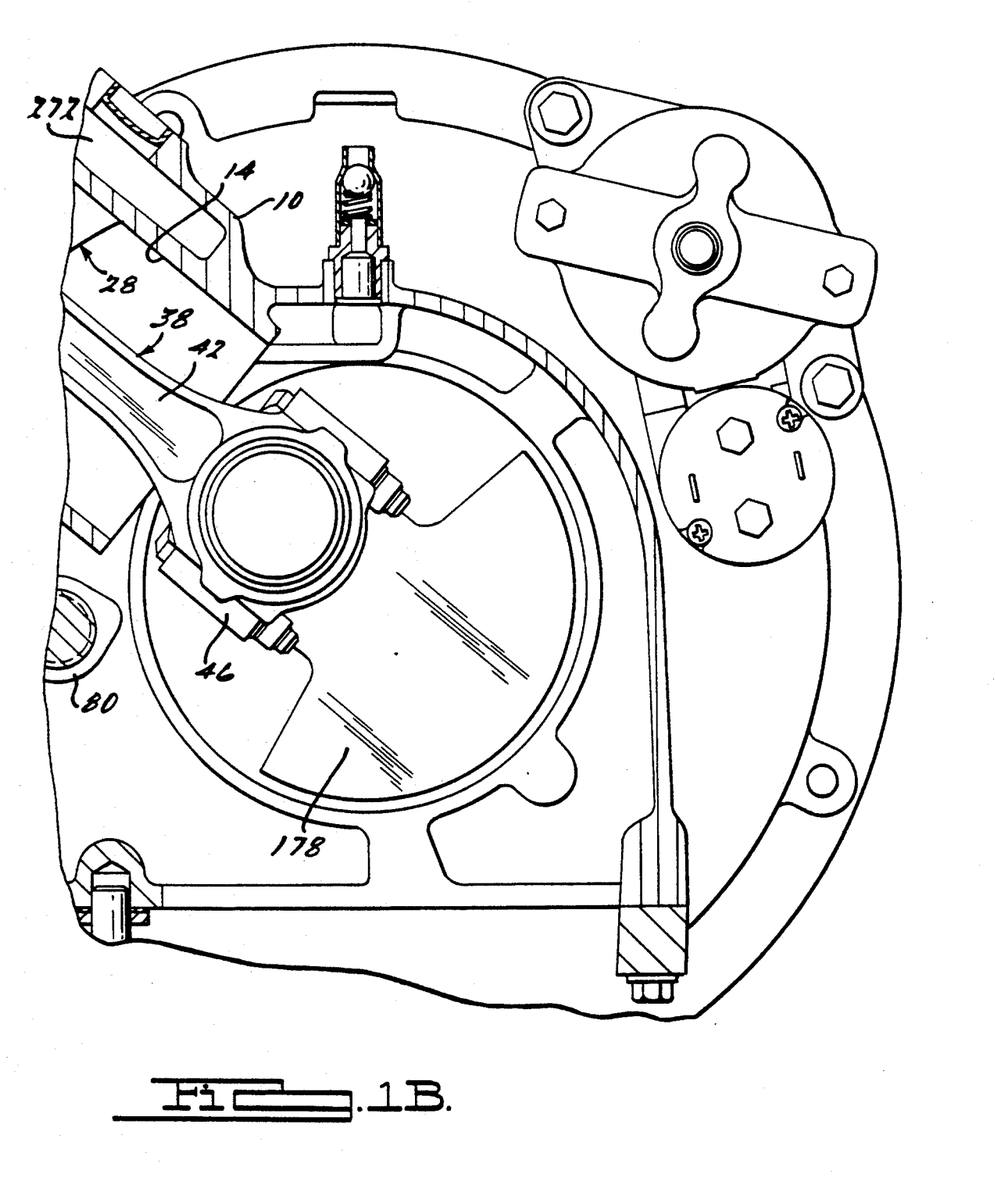
FIG. 1B is a partial cross-sectional view of the lower portion of the engine of FIG. 1A, taken on the same plane as the plane of FIG. 1A.

As seen in FIGS. 1A and 2B, the crankshaft has a pair of counterweights 178 and 180 which are situated on opposite sides of the crank portion 44. The path of movement of the counterweights 180 and 178 clears the path of movement of the cam portions 78 and 80, as indicated in FIGS. 1B and 2B.

Cam portion 80 engages a roller-type cam follower 182, which forms a part of a hydraulic valve lifter assembly 184. Valve lifter rod 186 is received through opening 188 in the crankcase casting 10.

The cylinder head is a gray cast-iron casting 190 having a machined surface 192 that registers with the surface 12 of the casting 10. Cylinder head bolts 194, preferably four in number as seen in FIG. 3 and in FIG. 1A, extend through bolt openings formed in the cylinder head 190 and are threadably received in threaded openings in the casting 10.

Cylinder head 190 is formed with valve lifter rod openings 196 which register with and form continuations of the rod openings 188 in the casting 10. A rocker arm 198 formed of ductile iron includes a roller tip assembly 200 comprising a roller 202 supported on roller shaft 204 which is end-supported by roller tip arms 206 and 208, as seen in FIG. 3. The opposite end of the rocker arm 198 carries a threaded ball seat 210. A steel ball 212 seated in a semi-spherical recess in the element 210 registers with the upper end of the valve lifter rod 186.

Lubricating oil from an oil galley shown in part in 214 in the casting 10 supplies lubricating oil through passage 216 to the valve lifter assembly 184. A portion of the oil is distributed through the lifter rod 186 to the lubrication passage 218 in the rocker arm 198.

Figure 3:
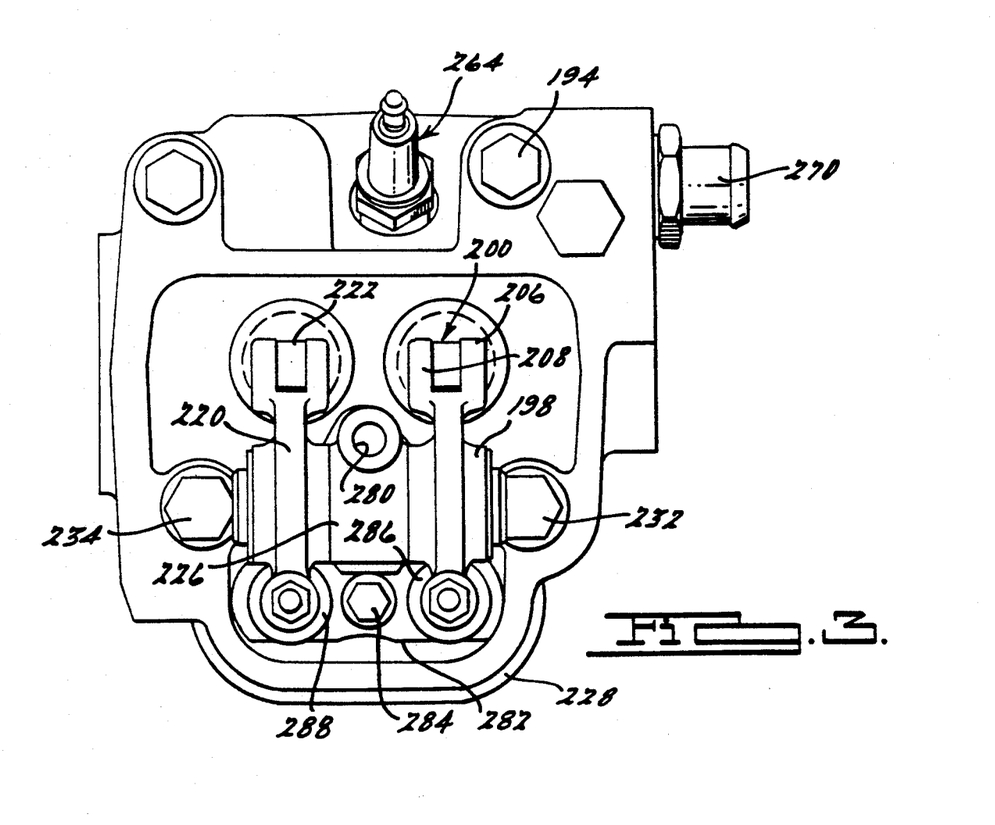
FIG. 3 is a plan view of the top of the cylinder head of FIGS. 2A and 1B.

A second ductile iron rocker arm, seen in FIG. 3, is provided for the intake valve as designated by reference numeral 220. It generally is similar to the rocker arm 198 and it carries a roller tip 222 which actuates the intake valve. The rocker arms are supported on a rocker arm shaft 224 received within the shaft opening formed in pedestal 226 carried by the rocker arm cover 228 as best seen in FIGS. 1A and 3. The rocker arm cover 228 is secured to the upper surface 230 of the cylinder head 190 by a bolt 237. A lubrication oil passage 236 is formed in the cylinder head 190 and communicates with lubrication oil passage 238 formed in the pedestal 226 for lubricating the shaft 224. Shaft 224 has a central loop passage 240 which communicates with a passage 238.

The roller 202 engages the upper end of exhaust valve stem 242. Valve spring 244 is seated on valve seat 246 formed in the cylinder head 190. The upper end of the valve spring 244 engages spring seat 248 which is secured to the upper end of the valve stem 242.

An iron alloy valve sleeve 250 surrounds the valve stem 242 and is received in sleeve opening 252 formed in the cylinder head 190. A valve stem shield 254 surrounds the upper end of the valve stem 242 to reduce oil consumption due to transfer of lubricating oil from the rocker arm housing to the lower end of the valve stem.

The head of the valve has a valve face 256 formed of cobalt alloy. A cobalt alloy valve seat ring 258 is seated in a valve seat recess 260 formed in the cylinder head.

The valve stem and valve seat construction for the intake valve may be similar to the corresponding elements of the exhaust valve. Thus, the illustration of the intake valve shown in FIG. 2A carries reference numerals corresponding to the reference numerals used to describe the exhaust valve, although prime notations are added.

A high ratio combustion chamber, which will be described subsequently, is indicated in FIG. 1B by reference numeral 262. A threaded spark plug opening 265 extends through the cylinder housing and receives a threaded end of spark plug 264, the electrodes 266 on the spark plug being situated at the upper end of the combustion chamber 262. The axis of the opening 265 is angularly offset with respect to the axis of the exhaust valve stem 242.

The cylinder head 190 has internal coolant passages 268, as shown in FIGS. 1B and in FIG. 2A, including portions which surround the valve stems. These passages communicate with a coolant passage fitting 270. Similarly, crankcase 10 provides coolant passages around the cylinder wall as shown at 272 in FIGS. 1A and FIG. 2B. Coolant fluid thus circulates around the cylinder walls and passes from the crankcase through a passage connected to fluid fitting 274 seen in FIG. 2A.

The intake stem preferably is formed of high manganese carbon steel. The exhaust valve stem is formed of stainless steel. Both stems are plated with heavy chrome plating to provide long service life. The high cobalt alloy valve seat and valve face can be plated to provide a hard, heat-resistant seat with a seat angle of approximately 30 degrees.

The exhaust port communicates with an exhaust gas flow passage 276. The upper region of the high ratio combustion chamber 262 communicates with the exhaust flow passage 276 through an open throat that runs generally parallel to the axis of the stem 242. Similarly, the inlet valve is provided with a straight, unrestricted gas charge flow passage extending in a direction parallel to the direction of the valve stem 242'. The open flow port provided by the valve communicates with gas charge supply passage 278 which, like passage 276, is formed in the cylinder head.

The rocker shaft support is in the form of a pedestal which is secured to the cylinder head by a clamping bolt that extends through the pedestal through bolt opening 280.

A retainer plate 282 is secured to the cast housing 10 by clamping bolt 284, as seen in FIG. 3. It partially surrounds the valve lifters, as shown at 286 and 288, and engages a flat on the lifter to prevent rotary displacement of the lifter assembly 184 relative to its axis, thus keeping the roller 182 in the same plane as the plane of the cam that the roller engages.

Rotary movement of the rocker pin shaft pedestal is prevented by a locator pin 290, as seen in FIG. 1A, which bridges the top surface 230 of the cylinder head 190.

Figure 4:
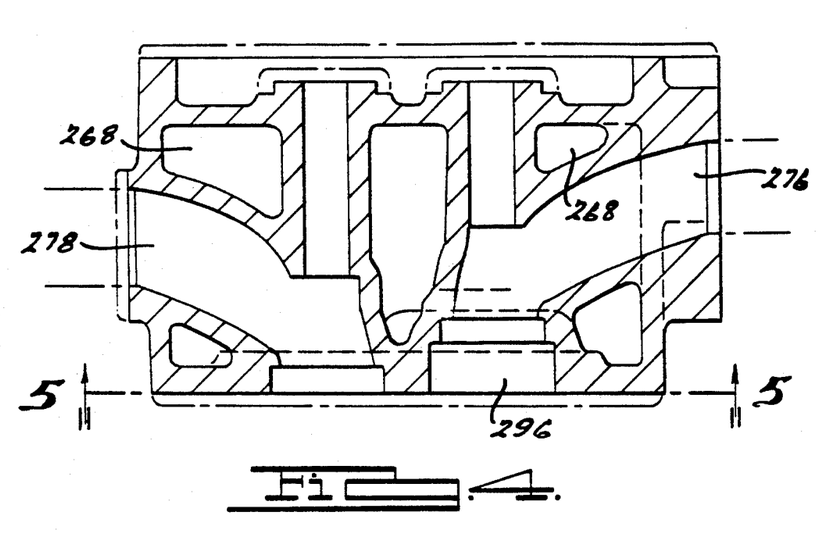
FIG. 4 is a cross-sectional view of the cylinder head casting as seen from the plane of section line 4—4 of FIG. 1B.
Figure 5:
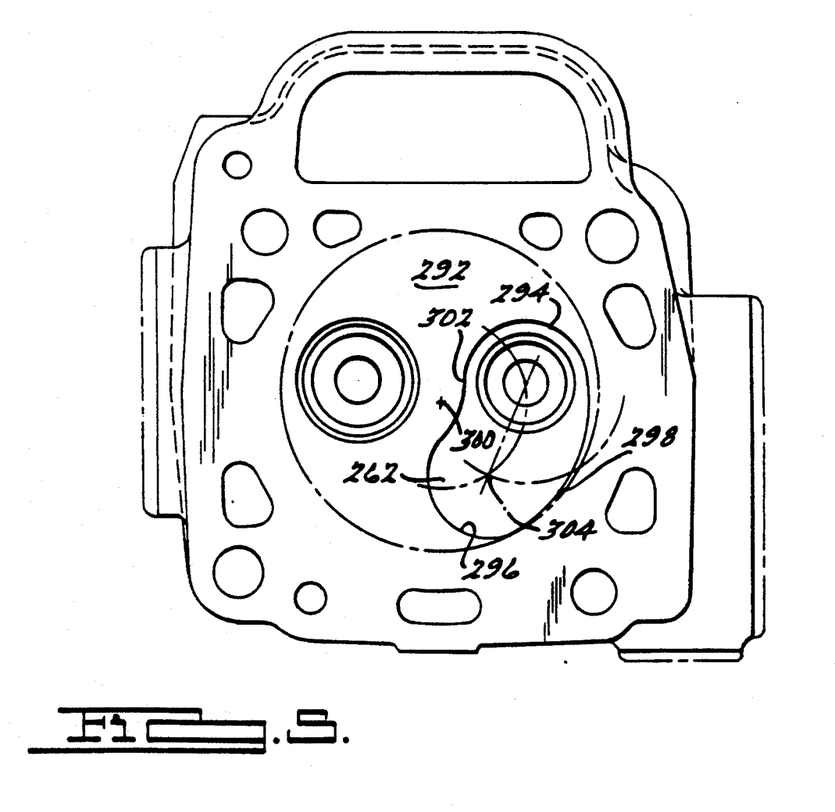
FIG. 5 is a cross-sectional view of the cylinder head of FIG. 4 as seen from the plane of section line 5—5 of FIG. 4.

FIGS. 4 and 5 show the geometry of the combustion chamber portions. The inlet zone, designated in FIG. 5 by reference numeral 292, is a so-called squish zone defined by the clearance between the top of the piston and the bottom surface of the cylinder head shown at 192. The top of the piston is flat, and at the top dead center of the piston the clearance is less than 0.060 inch but more than 0.020 inch. This represents about one percent of the stroke for the piston. The squish volume covers about 12 percent of the total combustion chamber volume when the piston is at the top dead center position.

A high ratio combustion chamber portion 262, as seen in FIG. 5, is a kidney-shaped chamber. The exhaust port is located at one extremity of the kidney-shaped chamber. The wall of the high-ratio combustion chamber portion in the immediate vicinity of the exhaust valve is located on a circular arc 294. In a preferred embodiment of the invention, the cylinder diameter is $2\frac{7}{8}$ inches. The center of the arc is the center of the exhaust valve and is equal to 0.591 inch.

The opposite end of the high-ratio combustion chamber portion 262 defines an arc 296 of a radius of 0.591 inch. The valve stem for the intake valve and the exhaust valve are parallel to the axis of the cylinder and are spaced apart 0.945 inch.

The arcs 296 and 294 are joined by a larger arc 298 having a center at 300. The point 300 is located 0.197 inch from a line joining the centers of the intake valve and the exhaust valve. The arcs 294 and 296 are joined also by a smaller arc 302 having a radius of 0.591.

The arcs 294 and 296 partially surround separate, spaced turbulence regions of the compact combustion zone.

The squish flow path extends between a portion of the intake chamber directly below the intake port and the high ratio combustion chamber portion. The spark plug electrodes are located in the portion of the high ratio combustion chamber remote from the exhaust valve between the center 304 of the arc 296 and the wall of the high ratio combustion chamber portion most remote from the exhaust valve. The squish ratio, which is the ratio of the area of the squish region of the combustion chamber to the total area, is about 64 percent in a preferred embodiment. If the ratio changes to a value above 75 percent or below 60 percent, deterioration in the combustion efficiency may occur.

When a gas charge enters the combustion chamber through the intake port, controlled turbulence begins and then progresses to the kidney-shaped compact combustion zone.

The straight valve bore simplifies the valve operation and contributes to a quiescent gas charge entry. There is no tangential swirl and no spoiler devices are introduced into the intake charge gas flow path. A controlled turbulence then is established as the piston approaches the cylinder head. The inlet port is unrestricted, thus reducing entry gas energy losses.

The dimensions mentioned above are for a cylinder diameter of $2\frac{7}{8}$ inches. The geometry of the high-ratio combustion chamber and the squish chamber provide for controlled burning and mixture transfer from the intake valve to the combustion zone with microscopic or minute turbulence or vortexes in the air/fuel mixture, thus producing controlled burning and flame propagation at a controlled speed while effecting the rapid burn that is necessary for improved efficiency.

Because a microscopic turbulence pattern develops as the air/fuel mixture is transferred from the squish zone to the compact combustion zone, the specific location of the spark plug is not as critical as in some prior art designs such as those described in this specification. Also, the height of the electrodes can be varied somewhat from the precise position shown in FIG. 1A without significantly affecting the efficiency of the burn. Also, our combustion chamber design eliminates the excessive turbulence found in some prior art combustion chamber designs, which eliminates a tendency for the air/fuel mixture to settle in corners or other quiescent places in the combustion chamber where the flame can be quenched as combustion is delayed, thus degrading emissions quality. Such excessive turbulence would also destroy the boundary layer and reduce the thermal efficiency while contributing to flame quenching as heat irreversibly is transferred from the combustion chamber to the surrounding cylinder wall and cylinder head.

Having described a preferred embodiment of our invention, what we claim and desire to secure by United States Letters Patent is:

1. An internal combustion engine with a four-stroke cycle adapted for use with gaseous fuel and air mixtures comprising a cylinder casting with a cylinder and coolant jacket surrounding said cylinder;

a piston in said cylinder having a generally flat piston head surface and defining a combustion chamber, a crankshaft mounted in said casting, a piston rod drivably connected to said crankshaft, said piston in its top dead center position having its head surface substantially in alignment with the end of said cylinder;

a cylinder head, said cylinder head and said cylinder casting having matching surfaces at a cylinder casting and cylinder head interface;

the clearance between said piston head surface and said surface of said cylinder head being at least 0.73 percent of the piston diameter but less than 2 percent of the piston diameter and defining a gas charge squish portion of said combustion chamber;

a high ratio combustion chamber portion in said cylinder head having a depth greater than the clearance between said piston and said cylinder head surface and an area less than 40 percent of the cylinder area and more than 15 percent of the cylinder area;

a gas charge inlet valve means in said combustion chamber at a location that is isolated from said high ratio combustion chamber portion for admitting a gas charge to said combustion chamber; and an exhaust valve in said high ratio combustion chamber portion;

said high ratio combustion chamber portion having contiguous gas turbulence regions defined by a kidney-shaped wall in said cylinder head, said wall having a convex curvature portion at one side thereof with a radius of curvature approximately equal to the radius of said cylinder and having a concave curvature portion at the opposite side thereof with a smaller radius of curvature, said exhaust valve being located at one of said gas turbulence regions, and a spark plug in said cylinder head at another of said gas turbulence regions, said concave curvature portion encircling said inlet valve.

2. The combination as set forth in claim 1 wherein said inlet valve means comprises a gas charge inlet flow passage with a flow entry port and a valve head registering with said valve port and a valve stem extending in a direction parallel to the axis of said cylinder, said inlet flow passage being adapted to direct a gas charge through said port in the direction of said valve stem.

3. The combination as set forth in claim 1 wherein said exhaust valve is located in said cylinder head and communicates with said high ratio combustion chamber portion at one end of said convex wall portion and said spark plug is located remote from said exhaust valve at the opposite end of said convex wall portion.

4. The combination as set forth in claim 1 wherein said inlet valve means includes a gas charge entry port in the plane of said matching surfaces whereby a gas charge is admitted into said combustion chamber in a direction normal to the matching surfaces thus effecting a quiescent gas charge flow characterized by minimal tangential motion.

5. The combination as set forth in claim 1 wherein said inlet valve means is located in said gas charge squish portion of said combustion chamber at a location approximately equidistant from each of said gas turbulence regions of said high ratio combustion chamber portion.

6. An internal combustion engine with a four-stroke cycle adapted for use with gaseous fuel and air mixtures comprising a cylinder casting with a cylinder and coolant jacket surrounding said cylinder;
   a piston in said cylinder having a generally flat piston head surface and defining a combustion chamber, a crankshaft mounted in said casting, a piston rod drivably connected to said crankshaft, said piston in its top dead center position having its head surface substantially in alignment with the end of said cylinder;
   a cylinder head, said cylinder head and said cylinder casting having matching surfaces at a cylinder casting and cylinder head interface;
   the clearance between said piston head surface and said surface of said cylinder head being at least 0.73 percent of the piston diameter but less than 2 percent of the piston diameter and defining a gas charge squish portion of said combustion chamber;
   a high ratio combustion chamber portion in said cylinder head having a depth greater than the clearance between said piston and said cylinder surface and an area less than 40 percent of the cylinder area and more than 15 percent of the cylinder area;
   a gas charge inlet valve means in said combustion chamber at a location that is isolated from said high ratio combustion chamber portion for admitting a gas charge to said combustion chamber; and
   an exhaust valve in said high ratio combustion chamber portion;
   said high ratio combustion chamber portion having contiguous gas turbulence regions defined by a kidney-shaped wall in said cylinder head, said wall having a convex curvature portion at one side thereof with a radius of curvature approximately equal to the radius of said cylinder and having a concave curvature portion at the opposite side thereof with a smaller radius of curvature, said exhaust valve being located at one of said gas turbulence regions, a spark plug in said cylinder head at another of said gas turbulence regions, said concave curvature portion encircling said inlet valve;
   said high ratio combustion chamber portion having a volume that effects a compression ratio of approximately 12:1, said piston having a bore-to-stroke ratio of approximately 1.12:1.

7. The combination as set forth in claim 6 wherein said inlet valve means comprises a gas charge inlet flow passage with a flow entry port and a valve head registering with said port and a valve stem extending in a direction parallel to the axis of said cylinder, said inlet flow passage being adapted to direct a gas charge through said port in the direction of said valve stem.

8. The combination as set forth in claim 6 wherein said exhaust valve is located in said cylinder head and communicates with said high ratio combustion chamber portion at one end of said convex wall portion and said spark plug is located remote from said exhaust valve at the opposite end of said convex wall portion.

9. The combination as set forth in claim 6 wherein said inlet valve means includes a gas charge entry port in the plane of said matching surfaces whereby a gas charge is admitted into said combustion chamber in a direction normal to the matching surfaces thus effecting a quiescent gas charge flow characterized by minimal tangential motion.

10. The combination as set forth in claim 6 wherein said inlet valve means is located in said gas charge squish portion of said combustion chamber at a location approximately equidistant from each of said gas turbulence regions of said high ratio combustion chamber portion.

* * * * *

UNITED STATES PATENT AND TRADEMARK OFFICE
CERTIFICATE OF CORRECTION

PATENT NO. : 5,230,321
DATED : July 27, 1993
INVENTOR(S) : John E. Lambert et al It is certified that error appears in the above-indentified patent and that said Letters Patent is hereby corrected as shown below:

Title page, item [57]:

Abstract, line 1, after "engine" delete "our-stroke" and substitute --having a four-stroke--.

Column 7, line 13, after "of" delete "the".

Column 9, line 14, after "rotor" delete "1 60" and substitute --160--.

Signed and Sealed this

Fifth Day of April, 1994

Attest:

BRUCE LEHMAN

*Attesting Officer*     *Commissioner of Patents and Trademarks*